United States Patent [19]

Levine

[11] 4,364,719

[45] Dec. 21, 1982

[54] SPRAY APPARATUS FOR METAL FORMING AND GLASSWARE FORMING MACHINES

[75] Inventor: Walter E. Levine, Port Huron, Mich.

[73] Assignee: Acheson Industries, Inc., Port Huron, Mich.

[21] Appl. No.: 297,017

[22] Filed: Aug. 27, 1981

[51] Int. Cl.³ .................. B30B 15/08; B29C 1/00
[52] U.S. Cl. .................. 425/78; 425/107;
425/DIG. 115; 425/98; 65/24; 65/169; 65/170;
164/149; 164/267
[58] Field of Search .......... 425/107, 78, 352, 354,
425/355, 98, DIG. 115, 36, 58; 65/169, 24, 170;
164/149, 267

[56] References Cited

U.S. PATENT DOCUMENTS

| | | | |
|---|---|---|---|
| 2,317,687 | 4/1943 | Larchar | 425/107 X |
| 2,362,058 | 11/1944 | Emerson | 425/DIG. 115 |
| 3,132,379 | 5/1964 | Crane | 425/DIG. 115 |
| 3,309,750 | 3/1967 | Gally | 425/DIG. 115 |
| 3,443,280 | 5/1969 | Hugger | 425/36 X |
| 3,995,979 | 12/1976 | Fedrigo | 425/DIG. 115 |
| 3,999,922 | 12/1976 | Shimada | 425/354 |
| 4,029,449 | 6/1977 | Longaberger | 425/58 X |

Primary Examiner—J. Howard Flint, Jr.
Attorney, Agent, or Firm—Harness, Dickey & Pierce

[57] ABSTRACT

A new spray ring apparatus for use in metal forming and glassware forming machines of the type having a forming cavity into which a fluid lubricant material is sprayed, said spray ring including a plurality of nozzles through which the fluid lubricant material is sprayed into the cavity in a tangential helical flow pattern to thereby uniformly coat the interior surfaces of the cavity prior to the forming of the metal or glassware parts therein.

8 Claims, 6 Drawing Figures

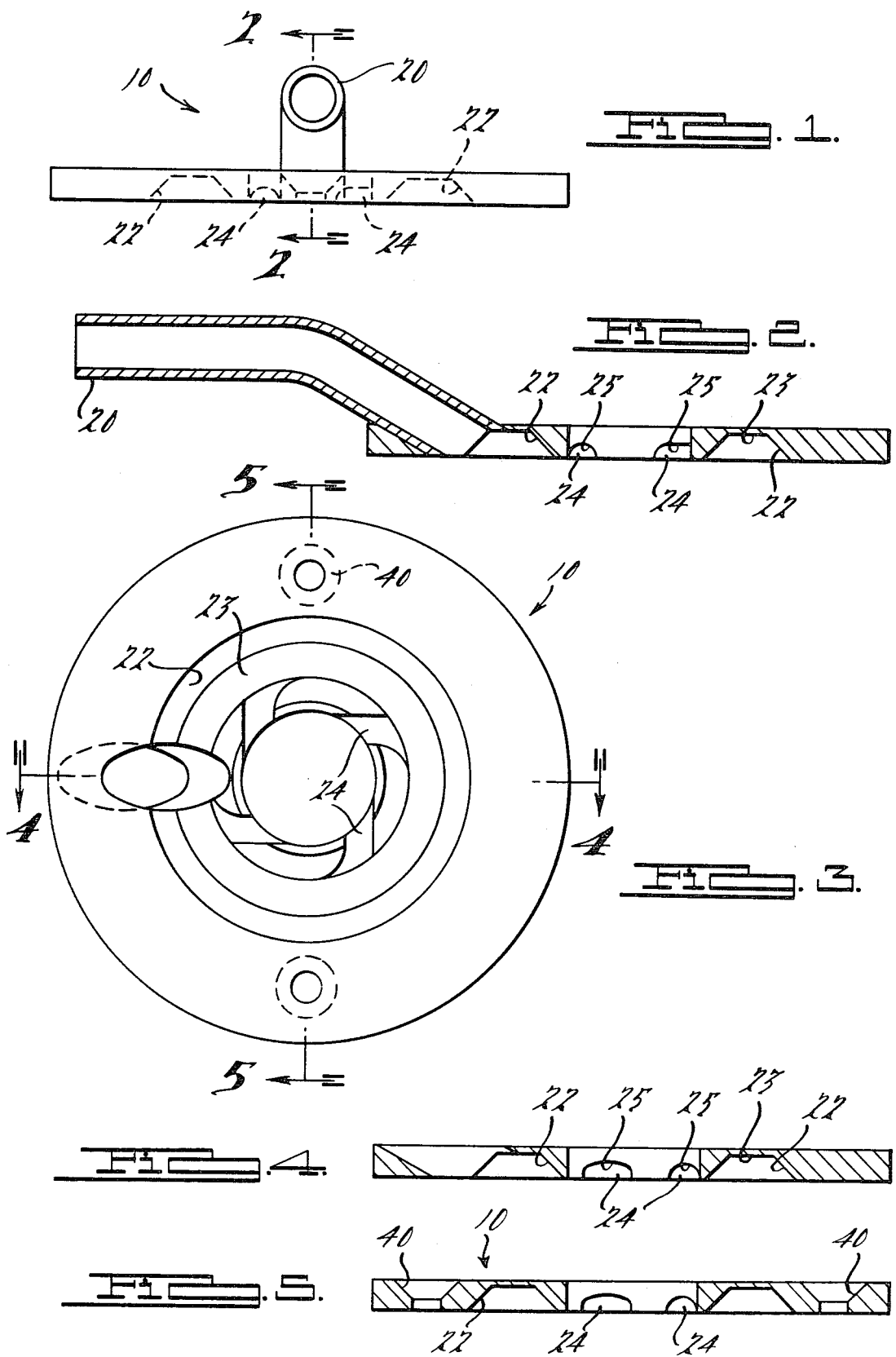

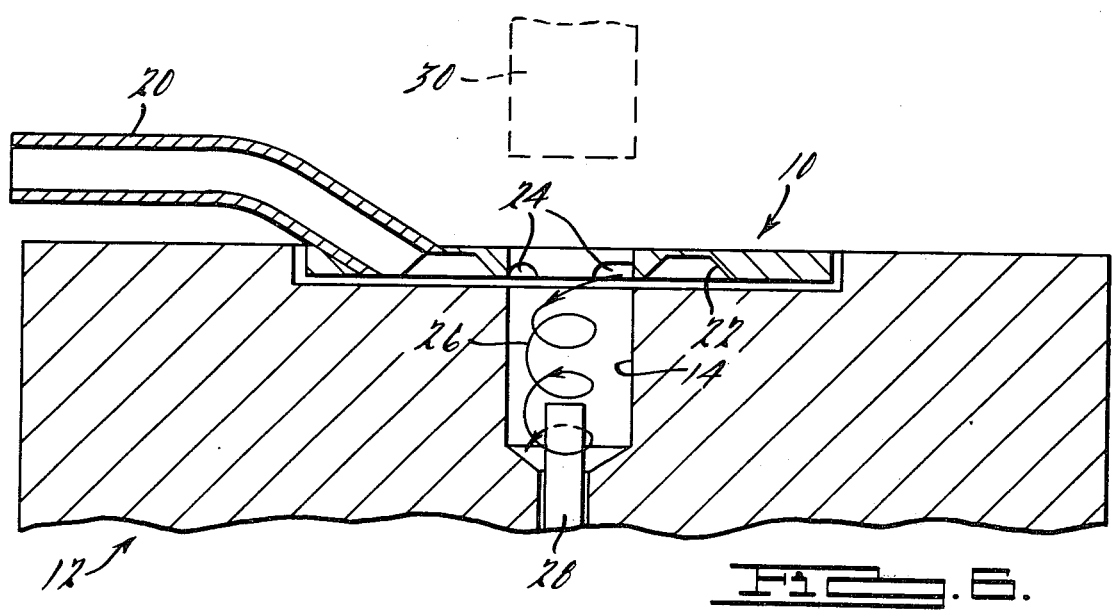

SPRAY APPARATUS FOR METAL FORMING AND GLASSWARE FORMING MACHINES

BACKGROUND OF THE INVENTION

This invention broadly relates to a novel lubricant spraying apparatus for use in metal forming and glassware forming machines. More particularly, the invention relates to a special spray ring apparatus used in such machines which includes a plurality of special nozzles which enable the fluid lubricant material to be sprayed into the cavity of the forming machine such that the interior surfaces of the cavity are uniformly and properly coated with the lubricant.

In the past there have been numerous problems in metal forming and glassware forming machines caused by the fact that the forming cavities utilized therein were not properly coated with the lubricant material which is conventionally used therein to provide lubricating and release agent properties to the cavity during the forming operations therein and, for release of the part after the forming operation has been completed. Such problems are highly significant in that improper lubricant coating can lead to highly serious distortions, deformations, improper configurations, etc. in the part being formed in the cavity.

The state of the art is indicated by the following U.S. patents: Hamilton U.S. Pat. No. 3,580,711; Duggan U.S. Pat. No. 3,508,893; Colchagoff U.S. Pat. No. 3,536,468; Keller U.S. Pat. No. 3,623,856; Keller U.S. Pat. No. 3,141,752; Renkl U.S. Pat. No. 3,801,299; Lichok et al. U.S. Pat. No. 3,480,422; Havens et al. U.S. Pat. No. 3,186,818; and British Pat. No. 1,349,121.

Accordingly, it is a primary object of this invention to provide a new lubricant spraying apparatus for use with metal forming and glassware forming machines.

Another object of the invention is to provide a new spray ring apparatus for use with either metal forming or glassware forming machines wherein said spray ring apparatus includes special nozzle means which are operative to spray a fluid lubricant material into the forming cavities of said machines in a unique manner such that the lubricant material is generally uniformly coated on the desired interior surfaces of the forming machine.

Other objects, features and advantages of the present invention will become apparent from the subsequent description and the appended claims taken in conjunction with the accompanying drawings.

BRIEF DESCRIPTION OF THE DRAWINGS

FIG. 1 illustrates a spray ring assembly in accordance with the invention;

FIG. 2 illustrates a cross-sectional view taken along the line 2—2 in FIG. 1;

FIG. 3 illustrates a top or plan view of the spray ring shown in FIGS. 1 and 2;

FIG. 4 illustrates a cross-sectional view taken along the line 4—4 in FIG. 3;

FIG. 5 illustrates a sectional view taken along the line 5—5 in FIG. 3; and

FIG. 6 illustrates usage of the spray ring of FIG. 2 in association with a metal forming machine.

SUMMARY OF THE INVENTION

Briefly stated, the present invention concerns a lubricant spraying apparatus for metal forming and glassware forming machines of the type having a forming cavity into which the material to be formed is placed, and a plurality of nozzle means arranged to discharge fluid lubricant into the cavity prior to each forming operation such that the walls of the cavity and parts associated therewith in the forming operation are properly coated with the lubricant, said apparatus being comprised of, a spray ring means which is positioned generally around the opening of the cavity, said plurality of nozzle means being positioned on the spray ring and being operative to discharge fluid lubricant into the cavity in a helical tangential flow pattern, and conduit means for connecting the nozzle means and spray ring means to a source of fluid lubricant whereby a predetermined amount of lubricant can be supplied to the cavity at desired intervals of operation.

DESCRIPTION OF THE INVENTION

Referring now to the drawings, FIGS. 1 through 5 illustrate the spray ring 10 in accordance with the invention. FIG. 6 illustrates the spray ring 10 in position on a metal forming machine 12 adjacent the top thereof and near the cavity 14 within which metal parts are formed. It is to be understood, however, that the invention is equally applicable to glassware forming machines.

The spray ring 10 is typically formed of metal and fits on top of a die cavity designated 14. For ease of illustration in FIG. 6, the spray ring 10 is shown in loose fitting engagement with the machine 12 near the top of the cavity 14, whereas, in actual practice the spray ring 10 would be in press fitting engagement with the top surface of the machine 12. In typical use of the spray ring 10 a lubricant composition and air mixture enters through the tubing or conduit means designated 20 and from there it travels around a grooved ring or manifold portion designated 22. The manifold has a top surface designated 23 (FIG. 2). The lubricant mixture then leaves the manifold 22 and enters the die cavity 14 at tangential nozzle openings designated 24. As the lubricant mixture leaves the spray ring 10 through the nozzle openings 24, the specially designed nozzles 24 create a tangential spray pattern for the atomized or fluidized lubricant air mixture, with the spray pattern or flow pattern of the lubricant being shown by the helical path designated 26 shown in FIG. 6. It is to be noted that each of the nozzle openings 24 has a top surface designated 25 (FIG. 2).

The spray ring 10 as shown in the drawings contains four of the nozzle openings designated 24 and the tangential spraying of the lubricant mixture into the cavity causes what may be described as a helical or circular flow pattern to occur and the lubricant travels down into the die cavity 14 and deposits a uniform coating on the walls of the cavity. In addition, the knock out pin 28 (FIG. 6) which, for example may be spring loaded to be depressed downwardly to the bottom of the cavity 14 when the metal slug is inserted into the machine for the forming operation, is also coated with the lubricant mixture in a uniform manner. The forming tool 30 shown in FIG. 6 is the tool which is used to punch down into the cavity at a high operating speed for the purpose of forming the metal part which is inserted into the cavity for the forming operation.

Machines of the type shown in FIG. 6 typically operate at very high speeds, for example, with approximately one part per second being formed in the machine. It is extremely important in the operation of such machines that the cavity be properly coated with lubricant mixture such that the parts being formed at the high operating speeds do not have distortions, bends, disconfigurations and the like, in the part being formed, as a result of the cavity 14 being improperly or nonuniformly coated with lubricant.

In accordance with the preferred aspects of the invention, it is usually desired that three or more of the special nozzle means designated 24 should be used, however, it is apparent that in some installations only two such nozzle openings may be required, whereas in other installations a plurality considerably higher than three of such nozzle openings may be desired.

The spray ring assembly designated 10 has been used under actual operating conditions in the forming of parts, such as the forming of valves for automobile internal combustion engines. The usage of the spray ring 10 in accordance with the invention under such actual operating conditions has been highly successful in preventing distortions, disconfigurations, scorching and the like in the formation of such metal parts.

Other aspects of the spray ring 10 are constituted by the counter sunk holes designated 40 which may be used to fasten the spray ring in position on the forming machine 12. Other means of fastening or holding the spray ring may, of course, also be used. In addition, it is to be understood that the spray ring 10 as shown in operating position on the machine 12 in FIG. 6 may also be suitably mounted such that the spray ring 10 can be pivoted or lifted in an out of position adjacent the top of the cavity 14 at desired intervals of operation of the machine. This may be accomplished, for example, by using a pivoting mechanism and flexible conduit for attachment to the tube 20 as will be understood by those skilled in the art. In addition, if desired the circular edge opening at the top of the cavity 14 may be champfered or beveled slightly to assist in the desired tangential flow pattern for the lubricant.

While the invention has been described with reference to a metal forming machine, the invention is also applicable to glass forming machines or even to plastic molding processes wherein lubricant spraying devices are conventionally used. It will be apparent that the preferred embodiments of the invention disclosed herein are well calculated to fulfill the objects above stated, and it will be appreciated that the invention is susceptible to modification, variation and change without departing from the proper scope or fair meaning of the subjoined claims.

What is claimed is:

1. A lubricant spraying apparatus for metal forming and glassware forming machines of the type having a forming cavity into which the material to be formed is placed, and a plurality of nozzle means arranged to discharge fluid lubricant into the cavity prior to each forming operation such that the walls of the cavity and parts associated therewith in the forming operation are properly coated with the lubricant, said apparatus being comprised of,
 a spray ring means which is positioned generally around the opening of the cavity,
 said plurality of nozzle means being positioned on the spray ring and being operative to discharge fluid lubricant into the cavity in a helical tangential flow pattern,
 conduit means for connecting the nozzle means and spray ring means to a source of fluid lubricant whereby a predetermined amount of lubricant can be supplied to the cavity at desired intervals of operation.

2. The apparatus according to claim 1 wherein, said spray ring means can be lifted in an out of position adjacent the cavity opening between each forming operation of the machine.

3. The apparatus according to claim 1 wherein, said nozzle means also operate to provide a lubricant coating on a punch member associated with the cavity which is used to knock out the part after it is formed.

4. The apparatus according to claim 1 wherein, said nozzle means are comprised of at least three or more nozzles positioned generally on the inner periphery of the spray ring means.

5. The apparatus according to claim 1 wherein, said fluid lubricant is inter-mixed with air such that the lubricant when sprayed through said nozzle means operates to generally uniformly coat the lubricant on the desired surfaces inside the cavity.

6. A lubricant spraying apparatus for metal forming and glassware forming machines of the type having a forming cavity into which the material to be formed is placed, and a plurality of nozzle means arranged to discharge fluid lubricant into the cavity prior to each forming operation such that the walls of the cavity and parts associated therewith in the forming operation are properly coated with the lubricant, said apparatus being comprised of,
 a spray ring means which is positioned generally around the opening of the cavity,
 said plurality of nozzle means being positioned on the spray ring and being operative such that each nozzle means discharges fluid lubricant into the cavity in a tangential flow pattern,
 conduit means for connecting the nozzle means and spray ring means to a source of fluid lubricant whereby a predetermined amount of lubricant can be supplied to the cavity at desired intervals of operation, and
 said fluid lubricant is inter-mixed with air such that the lubricant when sprayed through said nozzle means operates to generally uniformly coat the lubricant on the desired surfaces inside the cavity.

7. A lubricant spraying apparatus for metal forming and glassware forming machines of the type having a forming cavity into which the material to be formed is placed, and a plurality of nozzle means arranged to discharge fluid lubricant into the cavity prior to each forming operation such that the walls of the cavity and parts associated therewith in the forming operation are properly coated with the lubricant, said apparatus being comprised of,
 a spray means which is positioned generally around the opening of the cavity,
 said spray means including a plurality of nozzle means operative such that each nozzle means discharges fluid lubricant into the cavity in a tangential flow pattern,
 conduit means for connecting the nozzle means to a source of fluid lubricant whereby a predetermined amount of lubricant can be supplied to the cavity at desired intervals of operation, and
 said fluid lubricant is inter-mixed with air such that the lubricant when sprayed through said nozzle means operates to generally uniformly coat the lubricant on the desired surfaces inside the cavity.

8. A lubricant spraying apparatus for material forming machines used to form metal, glassware, or plastic and being of the type having a forming cavity into which the material to be formed is placed, and a plurality of nozzle means arranged to discharge fluid lubricant into the cavity prior to each forming operation such that the walls of the cavity and parts associated therewith in the forming operation are properly coated with the lubricant, said apparatus being comprised of, a spray means which is positioned generally around the opening of the cavity, said spray means including a plurality of nozzle means operative such that each nozzle means discharges fluid lubricant into the cavity in a tangential flow pattern, conduit means for connecting the nozzle means to a source of fluid lubricant whereby a predetermined amount of lubricant can be supplied to the cavity at desired intervals of operation, and said fluid lubricant is inter-mixed with air such that the lubricant when sprayed through said nozzle means operates to generally uniformly coat the lubricant on the desired surfaces inside the cavity.

* * * * *